United States Patent
Huang et al.

(10) Patent No.: US 9,137,694 B2
(45) Date of Patent: Sep. 15, 2015

(54) METHOD FOR DETECTING INTERFERENCE BETWEEN BASE STATIONS AND BASE STATION

(71) Applicant: HUAWEI TECHNOLOGIES CO., LTD., Shenzhen (CN)

(72) Inventors: Hui Huang, Shenzhen (CN); Jianrui Yang, Shenzhen (CN); Xin Chang, Shenzhen (CN); Ying Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 14/092,305

(22) Filed: Nov. 27, 2013

(65) Prior Publication Data

US 2014/0086089 A1    Mar. 27, 2014

Related U.S. Application Data

(63) Continuation of application No. PCT/CN2011/075008, filed on May 31, 2011.

(51) Int. Cl.
| | |
|---|---|
| H04W 24/08 | (2009.01) |
| H04W 72/08 | (2009.01) |
| H04W 88/08 | (2009.01) |
| H04W 92/20 | (2009.01) |

(52) U.S. Cl.
CPC ............ *H04W 24/08* (2013.01); *H04W 72/085* (2013.01); *H04W 88/08* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 8,068,786 B2* | 11/2011 | Pawar et al. ............ | 455/63.1 |
| 2002/0114297 A1* | 8/2002 | Karna et al. ............ | 370/335 |
| 2004/0081121 A1 | 4/2004 | Xu | |
| 2010/0182898 A1* | 7/2010 | Li et al. .................. | 370/208 |
| 2010/0255867 A1* | 10/2010 | Ishii et al. .............. | 455/501 |
| 2010/0284265 A1* | 11/2010 | Ogawa et al. .......... | 370/208 |
| 2012/0184311 A1 | 7/2012 | Yamamoto et al. | |

FOREIGN PATENT DOCUMENTS

| | | |
|---|---|---|
| CN | 1706141 A | 12/2005 |
| CN | 101047430 A | 10/2007 |
| CN | 101150825 A | 3/2008 |
| CN | 101990294 A | 3/2011 |
| JP | 2000316180 A | 11/2000 |
| JP | 2002542658 A | 12/2002 |
| JP | 2008187552 A | 8/2008 |
| JP | 2010011152 A | 1/2010 |
| WO | WO 2010/044183 A1 | 4/2010 |
| WO | WO 2010/063137 A1 | 6/2010 |
| WO | WO 2011/043413 A1 | 4/2011 |

OTHER PUBLICATIONS

IEEE Computer Society, "Part 16: Air Interface for Broadband Wireless Access Systems" IEEE Std 802.16™—May 29, 2009, pp. 694-1120.

\* cited by examiner

*Primary Examiner* — Hong Cho
(74) *Attorney, Agent, or Firm* — Brinks Gilson & Lione

(57) ABSTRACT

The present invention provides a method for detecting interference between base stations and a base station. The method includes: receiving, by a first base station, a command sent by an operation maintenance center, wherein the command comprises a frame number of a specified frame; collecting, by the first base station, a signal in an uplink sub-frame of the specified frame, wherein the collected signal comprises a signal obtained by collecting an index sequence sent by a second base station in a downlink sub-frame of the specified frame; and determining, by the first base station, an index sequence of the second base station, wherein the index sequence of the second base station is selected from a plurality of candidate index sequences, each of which is used to be correlated with the collected signal. Embodiments of the present invention can improve the detection efficiency and performance.

20 Claims, 2 Drawing Sheets

---

An interfered base station receives an instruction command sent by an operation maintenance center, where the instruction command includes a frame number of a specified frame ⟶ 11

↓

The interfered base station collects a signal in an uplink sub-frame of the specified frame, where the collected signal includes a signal obtained by collecting an index sequence sent by an interference base station via a downlink sub-frame of the specified frame; and the collected signal is used to perform correlation calculation with each of a plurality of preset candidate index sequences, so as to determine an index sequence of the interference base station from the candidate index sequences ⟶ 12

US 9,137,694 B2

METHOD FOR DETECTING INTERFERENCE BETWEEN BASE STATIONS AND BASE STATION

CROSS-REFERENCE TO RELATED APPLICATIONS

This application is a continuation of International Application No. PCT/CN2011/075008, filed on May 31, 2011, which is hereby incorporated by reference in its entirety.

TECHNICAL FIELD

The present invention relates to the mobile communications technology, and in particular, to a method for detecting interference between base stations and a base station.

BACKGROUND

Uplink and downlink working frequency bands of a time division duplex (Time Division Duplex, TDD) system are the same, in order to avoid mutual interference between an uplink signal and a downlink signal of base stations, time synchronization is required between the base stations of the TDD system, and a guard interval is reserved between a downlink sub-frame and an uplink sub-frame, so as to avoid the mutual interference between the base stations caused by a wireless signal propagation delay. The worldwide interoperability for microwave access (Worldwide Interoperability for Microwave Access, WiMAX) system is taken as an example, a transmit/receive transition gap (Transmit/Receive Transition Gap, TTG) exists between a downlink sub-frame and an uplink sub-frame, and a receive/transmit transition gap (Receive/Transmit Transition Gap, RTG) exists between the uplink sub-frame and the downlink sub-frame. None of base stations send or receive any wireless signal in the time corresponding to the TTG and the RTG. However, when the distance between two base stations is relatively large, a downlink signal sent by one base station arrives in an uplink receiving time slot of another base station due to a propagation delay, thereby affecting signal receiving of the other base station. In addition, the global positioning system (Global Positioning System, GPS) receiver providing a timing reference for the base station may cause clock deviation because of a fault, and once the clock deviation occurs, it may cause interference to other base stations. The primary problem of solving the interference between the base stations is locating an interference source, and then adjusting a related parameter of the interference source to reduce or eliminate the mutual interference between the base stations.

In the prior art, when the base station is determined to be interfered, the reference source can be located by a manner of closing suspicious base stations one by one; however, the manner of closing the base stations one by one is inefficient and may cause service interruption for a long time.

SUMMARY

Embodiments of the present invention provide a method for detecting interference between base stations and a base station, so as to improve detection efficiency and performance.

An embodiment of the present invention provides a method for detecting interference between base stations, including:

receiving, by an interfered base station, an instruction command sent by an operation maintenance center, where the instruction command includes a frame number of a specified frame; and collecting, by the interfered base station, a signal in an uplink sub-frame of the specified frame, where the collected signal includes a signal obtained by collecting an index sequence sent by an interference base station in a downlink sub-frame of the specified frame; and the collected signal is used to perform correlation calculation with each of a plurality of preset candidate index sequences, so as to determine an index sequence of the interference base station from the candidate index sequences.

An embodiment of the present invention provides a base station, including:

a receiver, configured to receive an instruction command sent by an operation maintenance center, where the instruction command includes a frame number of a specified frame; and a signal collection device, configured to collect a signal in an uplink sub-frame of the specified frame, where the collected signal includes a signal obtained by collecting an index sequence sent by an interference base station in a downlink sub-frame of the specified frame; and the collected signal is used to perform correlation calculation with each of a plurality of preset candidate index sequences, so as to determine an index sequence of the interference base station.

It can be seen from the technical solutions, the embodiments of the present invention do not need to manually close base stations one by one, which can improve efficiency, and avoid service interruption, so as to improve performance.

BRIEF DESCRIPTION OF DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

In order to make the objectives, technical solutions, and advantages of the present invention more comprehensible, the technical solutions according to embodiments of the present invention are clearly and completely described in the following with reference to the accompanying drawings. Apparently, the embodiments in the following description are merely a part rather than all of the embodiments of the present invention. All other embodiments obtained by persons skilled in the art based on the embodiments of the present invention without creative efforts shall fall within the protection scope of the present invention.

Figure 1:
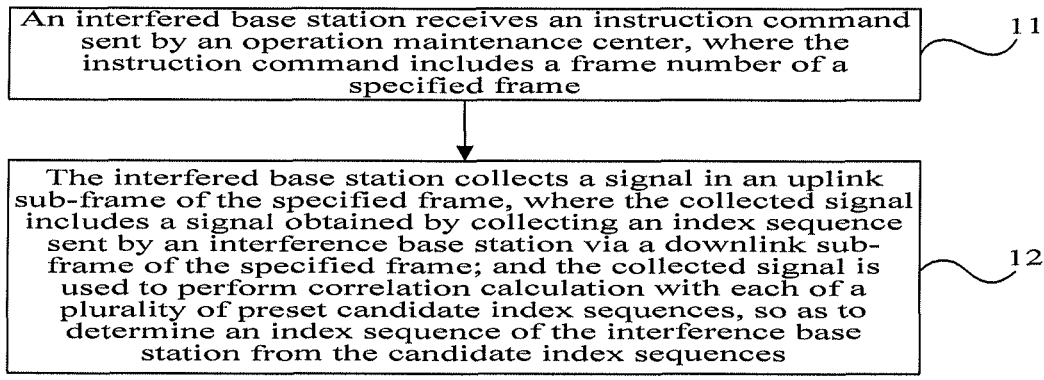
FIG. 1 is a schematic flow chart of a method according to Embodiment 1 of the present invention.

FIG. 1 is a schematic flow chart of a method according to Embodiment 1 of the present invention, which includes the following:

Step 11: An interfered base station receives an instruction command sent by an operation maintenance center, where the instruction command includes a frame number of a specified frame.

In order to increase transmit power of an index sequence, the embodiment of the present invention uses the specified frame to transmit the index sequence. In an actual application, for different moments, different frames can be used as specified frames; specifically, the operation maintenance center sends the instruction command to notify the base station of the specified frame.

Step 12: The interfered base station collects a signal in an uplink sub-frame of the specified frame, where the collected signal includes a signal obtained by collecting an index sequence sent by an interference base station in a downlink sub-frame of the specified frame; and the collected signal is used to perform correlation calculation with each of a plurality of preset candidate index sequences, so as to determine an index sequence of the interference base station from the candidate index sequences.

In the embodiment of the present invention, the interfered base station can collect, in the uplink sub-frame of the specified frame, the signal sent by the interference base station; specifically, the signal may be the index sequence of the interference base station. Afterwards, the interfered base station can perform correlation calculation according to the collected signal and the candidate index sequences, so as to determine the interference base station.

For example, a plurality of candidate index sequences is preset in the base station, the plurality of candidate index sequences includes the index sequences of base stations which may cause interference to the interfered base station. Specifically, the candidate index sequences may include the index sequence of base station A, the index sequence of base station B, and the index sequence of base station C. It is understandable that a base station that may cause interference to the base station can be determined according to an actual situation, for example, all base stations within a certain scope around a base station are set as base stations that may cause interference to the base station.

After the interference base station transmits an index sequence, the interfered base station can collect a signal; however, the interfered base station cannot determine the index sequence of the interfered base station only according to the collected signal. For example, the interference base station is base station A, objectively, the signal received by the interfered base station is the signal sent by base station A; however, the interfered base station needs to adopt a certain manner to determine that the collected signal is the signal sent by base station A. In the embodiment of the present invention, correlation calculation according to the candidate index sequences is used to determine to which base station the collected signal belongs. For example, after performing correlation calculation on the collected signal and each of the index sequence of base station A, the index sequence of base station B, and the index sequence of base station C, the interfered base station obtains that a result of correlation calculation according to the index sequence of base station A is the greatest, and therefore determines that the collected signal is the index sequence of base station A, so as to obtain that the interference base station is base station A.

The index sequence is uniquely determined by information used to uniquely identify the base station (an interfered base station or an interference base station). The information used to uniquely identify the base station may be an identifier of the base station or a sector identifier of the base station.

According to the identifier of the base station or the sector identifier of the base station, the base station can uniquely determine a corresponding index sequence, and then send the index sequence in the specified frame.

Furthermore, because interference is generally mutual, an interfered base station is also an interference base station for another base station; therefore, this embodiment can further include: sending, by the interfered base station, the index sequence of the interfered base station in a downlink sub-frame of the specified frame after receiving the instruction command. The index sequence is sent so as to enable another base station to determine the interference base station. The transition time from the downlink sub-frame to the uplink sub-frame of the specified frame may be smaller than a guard timeslot from a downlink sub-frame to an uplink sub-frame in a normal frame, for example, the transition time may be 20 μs.

In this embodiment, it is unnecessary to manually close base stations one by one, which can improve the efficiency; in this embodiment, an index sequence is sent in a specified frame, and because the index sequence is not mixed with a data signal, transmit power of the index sequence can be increased, thereby improving the detection performance; in addition, furthermore, the switch time in this embodiment is short, so that the detection performance can be further improved.

Figure 2:
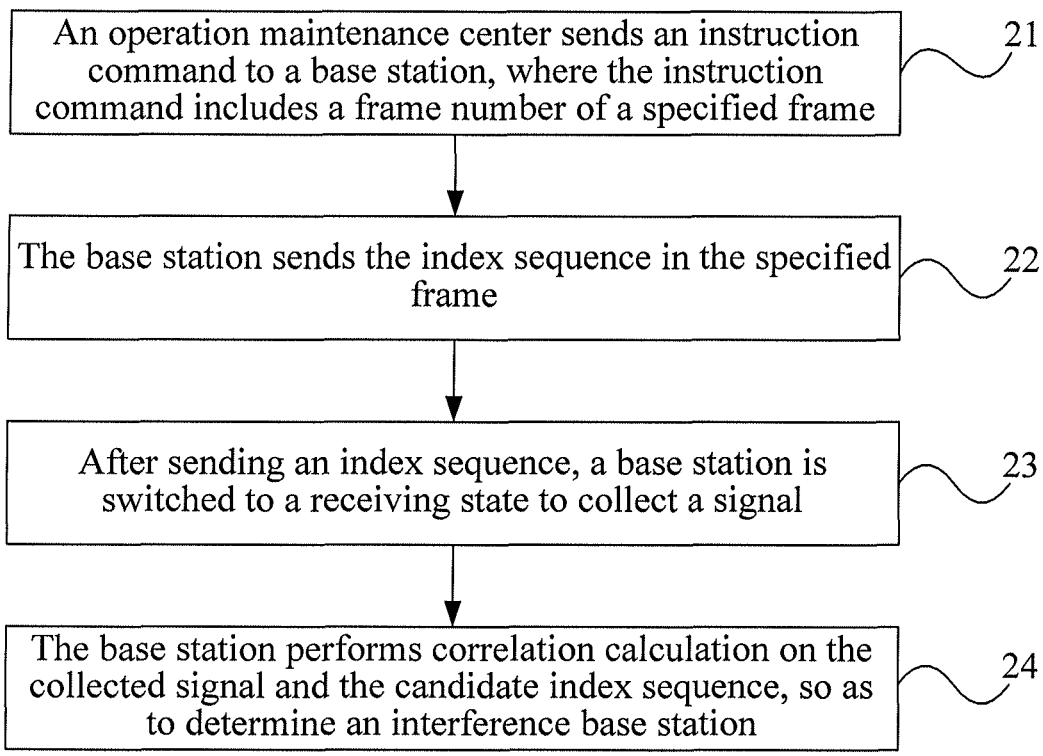
FIG. 2 is a schematic flow chart of a method according to Embodiment 2 of the present invention.

FIG. 2 is a schematic flow chart of a method according to Embodiment 2 of the present invention, which includes the following:

Step 21: An operation maintenance center sends an instruction command to a base station, where the instruction command includes a frame number of a specified frame.

The base station may include an interfered base station. The operation maintenance center may further send the instruction command to a neighboring base station of the interfered base station, and because the neighboring base station may be an interference base station, the operation maintenance center can also send an instruction to the neighboring base station, so that the neighboring base station sends an index sequence, so as to enable the interfered base station to determine an interference base station.

There are various manners for determining an interfered base station, for example, if noise power of a base station obtained by a noise detection is higher than a set value, it can be determined that the base station is the interfered base station.

In addition, the specified frame may be a frame requiring for interference scanning, that is, different from a normal frame, the frame is mainly used for the interference scanning, instead of carrying service data.

Step 22: The base station sends the index sequence in the specified frame.

Specifically, the index sequence can be sent in a downlink sub-frame of the specified frame. Because the specified frame is a frame defined in the embodiment of the present invention, a time interval between the downlink sub-frame of the specified frame and the uplink sub-frame of the specified frame can be set, and the time interval is not necessary to be equal to a value set for a TTG in an existing protocol. The time interval in the embodiment of the present invention can be set as small as possible, for example, the time interval is set to be 20 μs.

Figure 3:
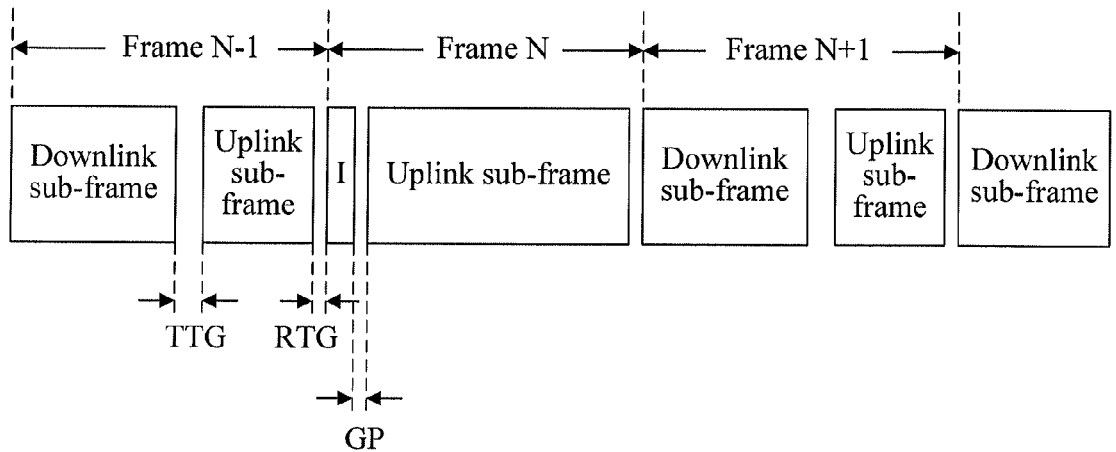
FIG. 3 is a first schematic diagram of a frame structure according to an embodiment of the present invention.

Specifically, FIG. 3 is a first schematic diagram of a frame structure according to an embodiment of the present invention. Referring to FIG. 3, a frame (frame) N−1 and a frame N+1 are both normal frames, and a frame N is a specified frame. The value of a TTG is the value of a time interval between a downlink sub-frame and an uplink sub-frame, specified by a protocol; and the value of a RTG is the value of a time interval between the uplink sub-frame and the downlink sub-frame, specified by the protocol. GP is a time interval between the downlink sub-frame (I part) and the uplink sub-frame (detection part) in the specified frame of the embodiment of the present invention, and the value of GP can be set as small as possible, for example, it is set to be 20 μs. In this embodiment, the downlink sub-frame of the specified frame N is merely used to send an index sequence, that is, the specified frame includes the I part and the detection part, where the I part is the downlink sub-frame, used to send an index sequence, and the detection part is the uplink sub-frame, used to collect a signal so as to determine the index sequence of an interference base station. Afterwards, correlation calculation may be performed according to the collected signal and the candidate index sequences to determine an interference base station. For details of a method for determining an interference base station, reference may be made to the following description.

Figure 4:
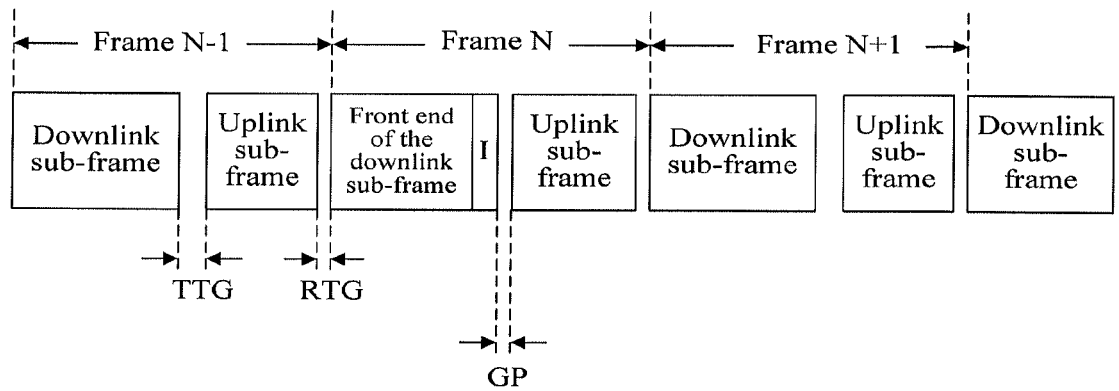
FIG. 4 is a second schematic diagram of a frame structure according to an embodiment of the present invention.

FIG. 4 is a second schematic diagram of a frame structure according to an embodiment of the present invention. Different from FIG. 3, a specified frame can also be used to send service data, that is, an index sequence I is sent at the rear end of a downlink sub-frame of the specified frame, and the front end of the downlink sub-frame can be used to send a signal the same as what is sent in a downlink sub-frame of a normal frame, for example, the service data. In this embodiment, the index sequence I may occupy the last one or more symbols of the downlink sub-frame of a WiMAX system.

In addition, the index sequence is uniquely determined by information used to distinguish base stations, where the information used to distinguish base stations may be an identifier of each base station or a sector identifier of the base station. In an ideal situation, in order to distinguish base stations, index sequences corresponding to the base stations are different. However, in an actual application, if each of all the base stations is corresponding to an index sequence, many index sequences may be required. Therefore, a multiplexing manner can be used, so that base stations within a certain area use different index sequences, while base stations in different areas or far from each other may use the same index sequence. For example, base stations in area A are far from base stations in area B, so that the base stations in area A can use different index sequences, and the base stations in area B use different index sequences, but a base station in area A and a base station in area B can use the same index sequence.

The index sequence may be selected from sequences having good time-domain self-correlation and cross-correlation characteristics, such as a small m sequence, a GOLD sequence, and a Zadoff-Chu sequence.

Specifically, the index sequence may be selected as a preamble (Preamble) signal of a base station, the Preamble signal is generated as stipulated in a WiMAX 16e protocol, and is uniquely determined by an IDCell and a Segment ID, where the value of the IDcell ranges from 0 to 31, and the value of the Segment ID ranges from 0 to 2. The benefit of using a Preamble as the index sequence is that: the impact of a reference scanning frame on timing synchronization and measurement of a terminal is reduced, the scheme is simple to implement, the range of detecting reference time is large, and the Preamble is applicable to the detection of an interference base station in a case where interference is caused by clock deviation.

Step 23: After sending an index sequence, a base station is switched to a receiving state to collect a signal.

After sending a Preamble signal in the downlink sub-frame of a specified frame, the base station is switched from a transmission state to the receiving state after one time interval GP, so as to collect the signal in the uplink sub-frame of the specified frame. If the value of the foregoing GP is set to be small, quick switch from the transmission state to the receiving state can be implemented.

Step 24: The base station performs correlation calculation on the collected signal and the candidate index sequences to determine an interference base station.

The foregoing neighboring base station may be a base station causing interference to the base station; candidate index sequences may be preset index sequences, and the candidate index sequences include an index sequence of a base station that may cause interference to the base station, for example, the candidate index sequences include an index sequence of a neighboring base station within a certain range.

The interfered base station saves the signal collected in the specified frame, where the collected signal is a signal obtained by collecting an index sequence sent by an interference base station. Afterwards, the following formula can be used to perform time-domain correlation calculation on the candidate index sequence and a signal collected by each antenna, and then, signals after time-domain correlation and corresponding to each antenna are combined together.

$$P_{Ind}(k) = \sum_{Ant=0}^{Ant=N-1} \sum_{i=0}^{I-1} \frac{\left|\sum_{n=0}^{L/I-1} x_{Ant}(i^*L/I + n + k) s^*_{Ind}(i^*L/I + n)\right|^2}{\sum_{n=0}^{L/I-1} |x_{Ant}(i^*L/I + n + k)|^2 |s_{Ind}(i^*L/I + n)|^2}$$

where n is a time index number, Ant is an antenna index number, $x_{Ant}(n)$ represents a baseband signal collected by the $Ant^{th}$ antenna when the time index is n, where the length of the baseband signal ranges from the end of Preamble transmission of the specified frame to the beginning of Preamble transmission of a next frame, and a signal in GP and RTG areas can be zero; Ind is an index number of a candidate index sequence, $s_{Ind}(n)$ represents a time-domain signal of the $Ind^{th}$ candidate index sequence; L represents the time-domain length of the candidate index sequence; N represents the number of receiving antennas; i is a time-domain segment index number; I represents the number of time-domain segments in correlation calculation; in the foregoing formula, for each corresponding i, a value derived from coherent accumulation within a segment is obtained at the numerator part, and is divided by the denominator part in the foregoing formula to obtain a value after power normalization, and the values after power normalization and corresponding to i is accumulated, so that a value derived from non-coherent accumulation between the segments is obtained; and $P_{Ind}(k)$ represents a correlation value between the $Int^{th}$ candidate index sequence and the collected signal, where k is a time index in correlation calculation, or, namely, a time delay value.

By calculating $P_{Ind}(k)$, correlation values of different candidate index sequences (corresponding to different Inds) in different time delays (corresponding to different ks) can be obtained.

Afterwards, a local peak point can be determined according to $P_{Ind}(k)$, where the local peak point refers to a point whose power $P_{Ind}(k)$ greater than a preset power threshold. Assuming that there are four correlation values greater than the preset threshold: P1, P2, P3, and P4, points corresponding to the four correlation values are local peak points, and position parameters of the four local peak points are (Ind1, k1) corresponding to P1, (Ind2, k2) corresponding to P2, (Ind3, k3) corresponding to P3, and (Ind4, k14) corresponding to P4; it is understandable that, one or more items of the position parameters may be the same, for example, (Ind1, k1) may corresponding to P1, and (Ind1, k2) may correspond to P2.

Secondly, a final peak point is obtained by detecting the local peak points, specifically: points with greatest correlation values are determined from the local peak points, and then a local peak point with a power difference greater than a preset power difference threshold P_Threshold or a local peak point with a time delay difference greater than a preset time delay difference threshold T_threshold is eliminated. For example, corresponding to the foregoing four local peak points, P1 is the greatest, it is assumed that the power difference between P1 and P2 is greater than P_Threshold, the local peak point corresponding to P2 is eliminated; it is assumed that the delay difference between k3 and k1 is greater than T_threshold, the local peak point corresponding to P3 is eliminated. Afterwards, P1 and P4 are used as final peak points.

Thirdly, RSSI corresponding to each candidate index sequence in the final peak point is calculated.

The RSSI of a candidate index sequence can be estimated in the following manner, for example, the RSSI of an $Ind^{th}$ candidate index sequence may be, $$RSSI_{Ind} \approx \sum_{Ant=0}^{Ant=N-1} \sum_{i=0}^{M_{Ind}-1} \left| \sum_{n=0}^{L-1} x_{Ant}(n+k_i) s^*_{Ind}(n) \right|^2$$

where $k_i$ is the position of an $i^{th}$ peak point corresponding to the $Ind^{th}$ candidate index sequence, and $M_{Ind}$ is the number of peak points corresponding to the $Ind^{th}$ candidate index sequence.

Afterwards, the base station corresponding to the candidate index sequence with the time delay greater than a preset time delay threshold and the RSSI greater than a preset RSSI threshold in the final peak points is determined as an interference base station. For example, the foregoing final peak points are the points corresponding to P1 and P4, and then, RSSI1 corresponding to Ind1 and RSSI2 corresponding to Ind2 are determined, and it is assumed that k1 is greater than the length of TTG and RSSI1 exceeds a preset RSSI1 threshold, so the base station corresponding to Ind1 is determined as the interference base station.

Furthermore, in order to improve detection performance when a strong signal transmitted by a neighboring base station and a weak signal transmitted by a remote base station coexist, an iterative detection method may be used: an index sequence is reconstructed according to the time delay and a signal amplitude corresponding to the detected final peak point, and a reconstructed signal is subtracted from $x_{Ant}(n)$ to obtain new $x_{Ant}(n)$, and the foregoing detection step is repeated.

A reconstruction process is as follows: a channel fading estimated value of a final peak point is determined according to the collected signal and the candidate index sequence, and the time delay position of the final peak point, for example, a correlation result of the collected signal and the candidate index sequence on the time delay position of the final peak point is used as the channel fading estimated value of the final peak point, and a calculation formula for the correlation result is as follows:

$$\hat{h}_{Ant,i} = \frac{\sum_{n=0}^{L-1} x_{Ant}(n+k_i) s^*_{Ind}(n)}{\sum_{n=0}^{L-1} s_{Ind}(n) s^*_{Ind}(n)}$$

The channel fading estimated value is multiplied by the candidate index sequence to serve as the reconstructed signal, and the reconstructed signal is subtracted from the collected signal, $$x\_new_{Ant}(n) = x_{Ant}(n) - \sum_i \hat{h}_{Ant,i} s_{Ind}(n-k_i)$$

Afterwards, $x\_new_{Ant}(n)$ is used to re-execute the foregoing procedures such as the local peak point, the final peak point, and the RSSI, so as to determine the interference base station.

During the foregoing detection, a discrete baseband signal of a one-multiple sampling rate may be used, and peak value detection may also be performed after interpolation processing is performed on the baseband signal of the one-multiple sampling rate to obtain a signal having a high velocity, so as to improve detection precision of a time delay and accuracy of reconstruction cancellation.

In addition, in this embodiment, an example that a base station determines an interference base station is taken; it may also be that a base station sends a collected signal, which is detected, to an operation maintenance center, and the operation maintenance center performs the correlation calculation to determine the interference base station.

In this embodiment, it is unnecessary to manually close base stations one by one, which can improve the efficiency; in this embodiment, an index sequence is sent in a specified frame, and because the index sequence is not mixed with a data signal, transmit power of the index sequence can be increased, thereby improving the detection performance; in addition, the switch time in this embodiment is short, so that the detection performance can be further improved.

Figure 5:
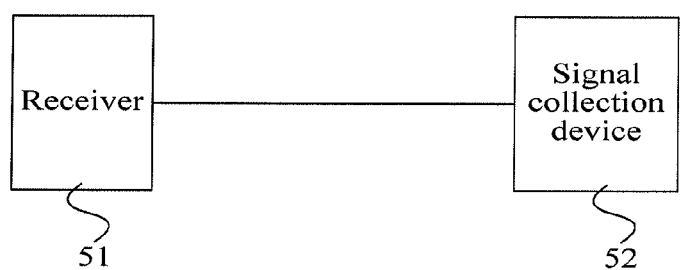
FIG. 5 is a schematic structural diagram of a base station according to Embodiment 3 of the present invention.

FIG. 5 is a schematic structural diagram of a base station according to Embodiment 3 of the present invention. The base station includes a receiver 51 and a signal collection device 52. The receiver 51 is configured to receive an instruction command sent by an operation maintenance center, where the instruction command includes a frame number of a specified frame; the signal collection device 52 is configured to collect a signal in an uplink sub-frame of the specified frame, where the collected signal includes a signal obtained by collecting an index sequence sent by an interference base station in a downlink sub-frame of the specified frame; and the collected signal is used to perform correlation calculation with each of a plurality of preset candidate index sequences, so as to determine an index sequence of the interference base station.

Furthermore, this embodiment may further include a sender, configured to: after the receiver receives the instruction command, send the index sequence of the base station in the downlink sub-frame of the specified frame, where a transition gap between the downlink sub-frame and the uplink sub-frame of the specified frame is smaller than a guard timeslot from a downlink sub-frame to an uplink sub-frame of a normal frame.

The sender may be specifically configured to: after the receiver receives the instruction command, merely send the index sequence in the downlink sub-frame of the specified frame; or, after the receiver receives the instruction command, send the index sequence at the rear end of the downlink sub-frame of the specified frame.

The base station may further include a processor. The processor is configured to perform time-domain correlation on the collected signal and each of candidate index sequences to obtain correlation values, each of which corresponds to a candidate index sequence and a time delay, perform detection on the correlation values corresponding to different candidate index sequences and different time delays to obtain at least one peak point and the candidate index sequence and the time delay corresponding to the peak point according to a preset power threshold, a preset power difference threshold, and a preset time delay difference threshold; and determine the index sequence of the interference base station according to an RSSI of the candidate index sequence corresponding to the peak point and the time delay corresponding to the peak point; or, the processor is configured to send the collected signal to the operation maintenance center, so as to enable the operation maintenance center to perform time-domain correlation on the collected signal and each of candidate index sequences to obtain correlation values, each of which corresponds to a candidate index sequence and a time delay, perform detection on the correlation values corresponding to different candidate index sequences and different time delays to obtain at least one peak point and the candidate index sequence and the time delay corresponding to the peak point according to a preset power threshold, a preset power difference threshold, and a preset time delay difference threshold; and determine the index sequence of the interference base station according to an RSSI of the candidate index sequence corresponding to the peak point and the time delay corresponding to the peak point.

The processor may be specifically configured to perform time-domain correlation on the collected signal and each of candidate index sequences to obtain a correlation value of a candidate index sequence in a time delay; use the candidate index sequence and the time delay corresponding to a correlation value greater than a preset power threshold as position parameters of local peak points; eliminate part of local peak points from the local peak points to obtain a final peak point, where a difference between a correlation value corresponding to an eliminated local peak point and a greatest correlation value is greater than a preset power difference threshold, or, a difference between a time delay corresponding to the eliminated local peak point and a time delay corresponding to the greatest correlation value is greater than a preset time delay difference threshold; calculate RSSIs corresponding to candidate index sequences in the final peak point; and determine a candidate index sequence whose time delay is greater than a preset time delay threshold and whose RSSI is greater than a preset RSSI threshold in the final peak point as the index sequence of the interference base station.

The processor may be further configured to, determine a channel fading estimated value of the final peak point according to the collected signal, the candidate index sequence, and the time delay position of the final peak point; multiply the channel fading estimated value by the candidate index sequence, to serve as a reconstructed signal; and subtract the reconstructed signal from the collected signal to obtain a new receiving signal, so as to perform correlation calculation according to the new receiving signal and the candidate index sequence to determine the index sequence of the interference base station.

In addition, the base station of this embodiment may be an interfered base station.

In this embodiment, it is unnecessary to manually close base stations one by one, which can improve the efficiency; in this embodiment, an index sequence is sent in a specified frame, and because the index sequence is not mixed with a data signal, transmit power of the index sequence can be increased, thereby improving the detection performance; in addition, the switch time in this embodiment is short, so that the detection performance can be further improved.

It is understandable that, related features in the method and device may be referenced mutually. In addition, "first" and "second" in the preceding embodiments are used to distinguish embodiments, but do not represent superiority or inferiority of the embodiments.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, and an optical disc.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not cause the essence of corresponding technical solutions to depart from the idea and scope of the present invention.

What is claimed is:

1. A method for detecting interference between base stations, comprising:
    receiving, by a first base station, a command sent by an operation maintenance center, wherein the command comprises a frame number of a specified frame;
    collecting, by the first base station, a signal in an uplink sub-frame of the specified frame, wherein the collected signal comprises a signal obtained by collecting an index sequence in a downlink sub-frame of the specified frame; and
    determining, by the first base station, that the collected signal is an index sequence of a second base station, wherein the index sequence of the second base station is selected from a plurality of candidate index sequences based on a result of a correlation calculation, and each of the plurality of candidate index sequences is used for the correlation calculation with the collected signal.

2. The method according to claim 1, after receiving, by the first base station, the command, the method further comprising:
    sending, by the first base station, an index sequence of the first base station in the downlink sub-frame, wherein a transition gap between the downlink sub-frame and the uplink sub-frame is smaller than a guard timeslot between a downlink sub-frame of a normal frame and an uplink sub-frame of the normal frame.

3. The method according to claim 2, wherein one of:
    the downlink sub-frame of the specified frame is merely used to send the index sequence of the first base station; or,
    the rear end of the downlink sub-frame of the specified frame is used to send the index sequence of the first base station.

4. The method according to claim 2, wherein the transition gap is 20 us.

5. The method according to claim 1, wherein the index sequence of the second base station is uniquely identified by identifying information of the second base station.

6. The method according to claim 5, wherein the index sequence of the second base station is a preamble signal of the second base station.

7. The method according to claim 1, wherein the determining, by the first base station, that the collected signal is an index sequence of the second base station comprising one of:
   selecting, by the first base station, the index sequence of the second base station from the plurality of candidate index sequences; or
   sending, by the first base station, the collected signal to the operation maintenance center, and receiving, by the first base station, the index sequence of the second base station, wherein the index sequence of the second base station is selected by the operation maintenance center from the plurality of candidate index sequences.

8. The method according to claim 7, wherein the index sequence of the second base station is selected from the plurality of candidate index sequences in following manner:
   performing time-domain correlation on the collected signal and each of the plurality of candidate index sequences to obtain correlation values, each of which corresponds to a candidate index sequence and a time delay;
   performing detection, according to a preset power threshold, a preset power difference threshold, and a preset time delay difference threshold, on the correlation values to obtain a peak point corresponding to a first candidate index sequence and a first time delay; and
   determining the index sequence of the second base station according to an received signal strength indicator (RSSI) of the first candidate index sequence and the first time delay.

9. The method according to claim 7, wherein the index sequence of the second base station is selected from the plurality of candidate index sequences in following manner:
   performing time-domain correlation on the collected signal and each of the plurality of the candidate index sequences to obtain correlation values, each of which corresponds to a candidate index sequence and a time delay;
   selecting correlation values greater than the preset power threshold, wherein each of the correlation values corresponds to a local peak point, wherein a position parameter of the local peak point includes a candidate index sequence and a time delay;
   selecting a final peak point from the local peak point, wherein a difference between a correlation value corresponding to an eliminated local peak point and a greatest correlation value is greater than the preset power difference threshold, or a difference between a time delay corresponding to an eliminated local peak point and a time delay corresponding to a greatest correlation value is greater than the preset time delay difference threshold, the eliminated local peak point being a local peak point that is not selected;
   calculating a RSSI of each of the plurality of the candidate index sequences in the final peak point; and
   selecting the index sequence of the second base station from the plurality of the candidate index sequences in the final peak point, wherein a first time delay corresponding to the index sequence of the second base station is greater than a preset time delay threshold, and a first RSSI of the index sequence of the second base station is greater than a preset RSSI threshold.

10. The method according to claim 9, after selecting the final peak point, the method further comprises:
    determining a channel fading estimated value of the final peak point according to the collected signal, the candidate index sequence, and a time delay position of the final peak point;
    obtaining a reconstructed signal by multiplying the channel fading estimated value by the candidate index sequence; and
    obtaining a new receiving signal by subtracting the reconstructed signal from the collected signal, wherein the new receiving signal is used to be correlated with the candidate index sequence to select the index sequence of the second base station from the candidate index sequences.

11. The method according to claim 1, wherein the collected signal is one of:
    a discrete baseband signal with a one-multiple sampling rate on a receiving antenna of the first base station, and
    a signal with a high velocity, wherein the signal with the high velocity is obtained by performing interpolation processing on the discrete baseband signal of the one-multiple sampling rate.

12. A base station, comprising:
    a receiver, configured to receive a command sent by an operation maintenance center, wherein the command comprises a frame number of a specified frame; and
    a signal collector, configured to collect a signal in an uplink sub-frame of the specified frame, wherein the collected signal comprises a signal obtained by collecting an index sequence in a downlink sub-frame of the specified frame; and
    a processor, configured to determine that the collected signal is an index sequence of a second base station, wherein the index sequence of the second base station is selected from a plurality of candidate index sequences based on a result of a correlation calculation, and each of the plurality of candidate index sequences is used for the correlation calculation with the collected signal.

13. The base station according to claim 12, further comprising:
    a sender, configured to: after the receiver receives the command, send an index sequence of the base station in the downlink sub-frame, wherein a transition gap between the downlink sub-frame and the uplink sub-frame is smaller than a guard timeslot between a downlink sub-frame of a normal frame and an uplink sub-frame of the normal frame.

14. The base station according to claim 13, wherein one of the downlink sub-frame of the specified frame is merely used to send the index sequence of the first base station; or,
    the rear end of the downlink sub-frame of the specified frame is used to send the index sequence of the first base station.

15. The base station according to claim 12, wherein the processor is configured to one of:
    select the index sequence of the second base station from the plurality of candidate index sequences; or
    send the collected signal to the operation maintenance center, and receiving, by the first base station, the index sequence of the second base station, wherein the index sequence of the second base station is selected by the operation maintenance center from the plurality of candidate index sequences.

16. The base station according to claim 15, wherein the processor is configured to select the index sequence of the second base station from the plurality of candidate index sequences in following manner:
- perform time-domain correlation on the collected signal and each of the plurality of the candidate index sequences to obtain correlation values, each of which corresponds to a candidate index sequence and a time delay;
- perform detection, according to a preset power threshold, a preset power difference threshold, and a preset time delay difference threshold, on the correlation values to obtain a peak point corresponding to a first candidate index sequence and a first time delay; and
- determine the index sequence of the second base station according to an received signal strength indicator (RSSI) of the first candidate index sequence and the first time delay.

17. The base station according to claim 15, wherein the processor is configured to select the index sequence of the second base station from the plurality of candidate index sequences in following manner:
- perform time-domain correlation on the collected signal and each of the plurality of the candidate index sequences to obtain correlation values, each of which corresponds to a candidate index sequence and a time delay;
- selecting correlation values greater than the preset power threshold, wherein each of the correlation values corresponds to a local peak point, wherein a position parameter of the local peak point includes a candidate index sequence and a time delay;
- selecting a final peak point from the local peak point, wherein a difference between a correlation value corresponding to an eliminated local peak point and a greatest correlation value is greater than the preset power difference threshold, or a difference between a time delay corresponding to an eliminated local peak point and a time delay corresponding to a greatest correlation value is greater than the preset time delay difference threshold, the eliminated local peak point being a local peak point that is not selected;
- calculate a RSSI of each of the plurality of the candidate index sequences in the final peak point; and
- selecting the index sequence of the second base station from the plurality of the candidate index sequences in the final peak point, wherein a first time delay corresponding to the index sequence of the second base station is greater than a preset time delay threshold, and a first RSSI of the index sequence of the second base station is greater than a preset RSSI threshold.

18. The base station according to claim 17, wherein the processor is further configured to:
- determine a channel fading estimated value of the final peak point according to the collected signal, the candidate index sequence, and a time delay position of the final peak point;
- obtain a reconstructed signal by multiplying the channel fading estimated value by the candidate index sequence; and
- obtaining a new receiving signal by subtracting the reconstructed signal from the collected signal, wherein a new receiving signal is used to be correlated with the candidate index sequence to select the index sequence of the second base station from the candidate index sequences.

19. A system, comprising a base station according to claim 12.

20. The system according to claim 19, further comprising the second base station.

* * * * *